(12) United States Patent
Liu

(10) Patent No.: US 7,832,364 B2
(45) Date of Patent: Nov. 16, 2010

(54) HEAT TRANSFER UNIT FOR STEAM GENERATION AND GAS PREHEATING

(75) Inventor: Yunquan Liu, Katy, TX (US)

(73) Assignee: Texaco Inc., San Ramon, CA (US)

( * ) Notice: Subject to any disclaimer, the term of this patent is extended or adjusted under 35 U.S.C. 154(b) by 285 days.

(21) Appl. No.: 11/610,992

(22) Filed: Dec. 14, 2006

(65) Prior Publication Data

US 2008/0141951 A1    Jun. 19, 2008

(51) Int. Cl.
    *F24H 1/08* (2006.01)
(52) U.S. Cl. ............... 122/18.1; 122/18.2; 165/163; 165/164
(58) Field of Classification Search ........... 122/18.1, 122/18.2, 18.3, 18.31, 31.1, 114, 117, 126, 122/367.1, 15.1, 32; 165/104.21, 157, 163, 165/164, 104.13, 104.14
See application file for complete search history.

(56) References Cited

U.S. PATENT DOCUMENTS

| | | | | | |
|---|---|---|---|---|---|
| 2,981,250 | A | * | 4/1961 | Stewart | 122/17.2 |
| 4,149,673 | A | * | 4/1979 | Hapgood | 237/17 |
| 4,316,434 | A | * | 2/1982 | Bailey | 122/20 B |
| 4,357,910 | A | * | 11/1982 | Blockley et al. | 122/248 |
| 4,393,815 | A | * | 7/1983 | Pedersen et al. | 122/31.1 |
| 4,479,484 | A | * | 10/1984 | Davis | 122/18.2 |
| 4,993,402 | A | * | 2/1991 | Ripka | 122/18.2 |
| 5,022,379 | A | * | 6/1991 | Wilson, Jr. | 126/116 R |
| 5,311,843 | A | * | 5/1994 | Stuart | 122/248 |
| 6,159,001 | A | * | 12/2000 | Kushch et al. | 431/7 |
| 6,397,788 | B2 | * | 6/2002 | Besik | 122/367.3 |
| 6,427,638 | B1 | * | 8/2002 | Kolbusz et al. | 122/15.1 |
| 6,623,603 | B1 | * | 9/2003 | Call et al. | 202/155 |
| 6,984,372 | B2 | * | 1/2006 | Randhava et al. | 423/652 |
| 7,235,217 | B2 | * | 6/2007 | Nguyen | 422/198 |
| 7,337,752 | B2 | * | 3/2008 | Boros et al. | 122/15.1 |
| 2002/0083646 | A1 | | 7/2002 | Deshpande et al. | |
| 2002/0088740 | A1 | | 7/2002 | Krause et al. | |
| 2002/0090327 | A1 | | 7/2002 | Deshpande | |
| 2002/0090328 | A1 | | 7/2002 | Deshpande | |
| 2002/0094310 | A1 | | 7/2002 | Krause et al. | |
| 2002/0098129 | A1 | | 7/2002 | Martin et al. | |
| 2003/0021742 | A1 | | 1/2003 | Krause et al. | |
| 2003/0103880 | A1 | | 6/2003 | Bunk et al. | |
| 2004/0194381 | A1 | | 10/2004 | Wheat et al. | |
| 2004/0194383 | A1 | | 10/2004 | Wheat et al. | |
| 2004/0194384 | A1 | | 10/2004 | Nguyen | |
| 2004/0197240 | A1 | | 10/2004 | Wheat | |
| 2004/0197615 | A1 | | 10/2004 | Mirkovic et al. | |
| 2004/0197625 | A1 | | 10/2004 | Deshpande et al. | |
| 2004/0197718 | A1 | | 10/2004 | Deshpande et al. | |
| 2006/0130402 | A1 | | 6/2006 | Wheat et al. | |
| 2006/0277828 | A1 | | 12/2006 | Licht | |
| 2006/0293862 | A1 | | 12/2006 | Copeman et al. | |
| 2008/0141584 | A1 | | 6/2008 | You et al. | |
| 2008/0141675 | A1 | * | 6/2008 | Liu et al. | 60/777 |
| 2008/0141951 | A1 | * | 6/2008 | Liu | 122/18.2 |

* cited by examiner

*Primary Examiner*—Gregory A Wilson
(74) *Attorney, Agent, or Firm*—Melissa Patangia

(57) ABSTRACT

The present invention discloses a heat transfer unit which integrates a boiler and a gas preheater for steam generation and gas preheating. In one embodiment, the heat transfer unit of the present invention may be used in fuel processing applications. In this embodiment, the heat transfer unit may be located downstream of a combustor such as an anode tailgas oxidizer.

13 Claims, 4 Drawing Sheets

HEAT TRANSFER UNIT FOR STEAM GENERATION AND GAS PREHEATING

FIELD OF THE INVENTION

The present invention relates generally to a heat transfer unit for steam generation and gas preheating. The present invention relates specifically to a heat transfer unit with boiler and gas preheater integrated in one unit to generate superheated steam and hot gas (air or fuel). In one illustrative embodiment, the present invention is utilized in fuel processing applications and specifically may be located downstream of a combustor or an anode tailgas oxidizer.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The cleanup processes are usually comprised of a combination of desulfurization, high temperature water-gas shift, low temperature water-gas shift, selective CO oxidation, or selective CO methanation. Alternative processes include hydrogen selective membrane reactors and filters.

In a fuel processing unit, such as an SR or ATR reactor, superheated steam and preheated air and/or fuel are required. And the fuel processing efficiency is directly affected by the extent to which steam can be superheated and how hot air or fuel can be preheated.

Oftentimes, hot combustion exhaust (also called flue gas) from a combustor or an anode tailgas oxidizer (ATO) is used as the heating source for steam generation and for air/fuel preheating. In addition to the fuel reformer, a fuel processing system typically includes a boiler and an air/fuel preheater which consists of a shell with several spiral coils inside for heat exchanging and for steam generation. The hot combustion exhaust gas typically passes through the shell once, while water and cold gas (air or fuel) flow through the inside coils. In such a configuration, steam can be generated yet, the steam is not superheated hot enough to the desired temperature (for example 600° C.). Further, the steam production is not stable due to the easy formation of slug flow inside the coils. In addition, the heat transfer efficiency for gas preheating is very limited and as a result, air and/or fuel cannot be preheated hot enough for ATR applications.

The poor steam production and heat transfer efficiency may be attributed to facets of the design of the boiler and air/fuel preheater. First, the combusted exhaust gas passes through the shell only once which does not provide for sufficient contact time between the hot exhaust gas and the cold streams. Second, the typical boiler utilizes a ¼ inch spiral coil, and the moving of two-phase flow inside the coil is very close to horizontal, as a result, slug flow is more likely formed in so small diameter coils. Third, most of the time, the hot and cold streams flow co-currently, which limits the cold streams from being heated to a temperature above the exit temperature of the ATO exhaust.

A design for a boiler and a gas preheater which has both effective heat transfer and stable steam production is needed. The present invention provides a heat transfer unit for steam generation and gas preheating. Optionally, the heat transfer unit of the present invention may be located downstream of a combustor or an ATO in fuel processing applications.

SUMMARY OF THE INVENTION

The present invention discloses a heat exchanger with boiler and gas preheater integrated in one unit to generate superheated steam and hot gas (air or fuel). In one embodiment, the heat transfer unit of the present invention may be located downstream of a combustor, such as an anode tailgas oxidizer (ATO), in fuel processing applications.

One of the features of the design of the heat transfer unit of the present invention is that hot exhaust gas from the combustor or ATO passes through the cylindrical shell of the present invention three times (either up or down) instead of the traditional one pass. This feature increases the contact time of hot exhaust contacting with cold streams thus improving heat transfer.

A second feature of the design of the heat transfer unit of the present invention is that the boiler design is a compromise of both flow boiling and pool boiling. The water inside the bell shape annulus of the present invention can flow upward just like a flow boiling but it does not form slug easily because there is a relatively large open space at the top for knocking liquid droplets off which makes the two-phase flow non-continuous thus separating steam vapor from water. In addition, the boiler of the present invention also resembles pool boiling as there is some water remaining in the bell shape reservoir due to continued feeding of water and the water level is typically constant under steady state conditions. Thus unfavorable slug formation that is often encountered in a flow boiling type heat exchanger is minimized and more stable steam production is achieved.

Another feature of the design of the heat transfer unit of the present invention is that it has a better turn-down ratio for steam production because the boiling heat transfer surface area can vary with water level which correspondingly changes with the water flowrate.

An additional feature of the design of the heat transfer unit of the present invention is that it incorporates a rolled fin heat exchanger to enhance gas-gas heat exchanger, especially at locations where the heating source has already been cooled down.

Further, the design of the heat transfer of the present invention is that steam or gas can be heated to much higher temperature due to the counter-current flow path between hot exhaust and cold streams.

In summary, the design of the heat exchanger of the present invention provides effective heat transfer and stable steam production for fuel processing applications.

BRIEF DESCRIPTION OF THE DRAWINGS

The description is presented with reference to the accompanying drawings in which.

DESCRIPTION OF ILLUSTRATIVE EMBODIMENTS

The present invention discloses a heat transfer unit with boiler and gas preheater integrated in one unit to generate superheated steam and hot gas (air or fuel). In one embodiment of the present invention, the heat transfer unit of the present invention is used in conjunction with a fuel processing unit; however, it is contemplated that the heat transfer unit of the present invention may also be used with other applications and is not limited to fuel processing applications.

Superheated steam and preheated air and/or fuel are required for a fuel processing system. A fuel processor is generally an apparatus for converting hydrocarbon fuel into a hydrogen rich gas. In one embodiment of the present invention, the compact fuel processor described herein produces a hydrogen rich gas stream from a hydrocarbon fuel for use in fuel cells; however, the scope of the invention is not limited to such use.

The hydrocarbon fuel for the fuel processor may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for the fuel processor include, but are not limited to hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
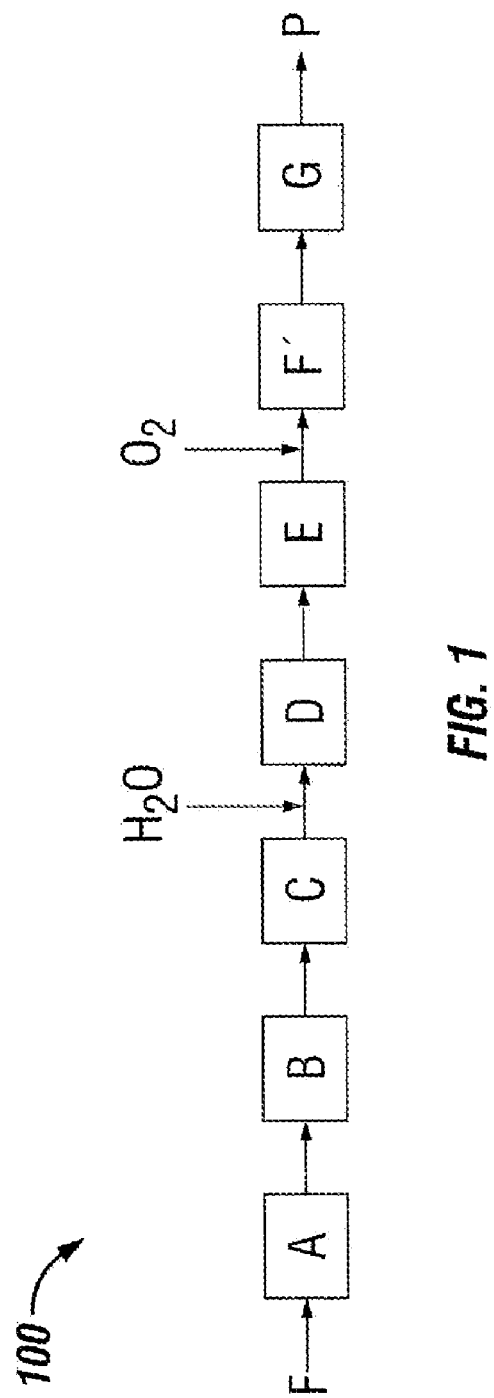
FIG. 1 depicts a simple process flow diagram for a fuel processor.

With reference to FIG. 1, FIG. 1 depicts a simple process flow diagram for a fuel processor illustrating the process steps included in converting a hydrocarbon fuel into a hydrogen rich gas. One of skill in the art should appreciate that a certain amount of progressive order is needed in the flow of the reactants though the reactors disclosed herein.

Process step A is an autothermal reforming process in which two reactions, partial oxidation (formula I, below) and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \quad \text{(I)}$$

$$CH_4 + H_2O \rightarrow 3H_2 + CO \quad \text{(II)}$$

The partial oxidation reaction occurs very quickly to the complete conversion of oxygen added and produces heat: The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C. to about 900° C., depending on the feed conditions and the catalyst. The invention uses a catalyst bed of a partial oxidation catalyst with or without a steam reforming catalyst. The catalyst may be in any form including pellets, spheres, extrudate, monoliths, and the like. Partial oxidation catalysts should be well known to those with skill in the art and are often comprised of noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. One illustrative embodiment for step B is the use of a heat exchanger utilizing feed stream F as the coolant circulated through the heat exchanger. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \quad \text{(III)}$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O + CO \rightarrow H_2 + CO_2 \quad \text{(IV)}$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° C. to about 600° C. and can include transition metal oxides such as ferric oxide or chromic oxide, and optionally including a promoter such as copper or iron suicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F' is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F'. The oxygen is consumed by the reactions of process step G described below. The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \quad \text{(V)}$$

$$H_2 + \tfrac{1}{2}O_2 \rightarrow H_2O \quad \text{(VI)}$$

The preferential oxidation of carbon monoxide is favored by low temperatures. Since both reactions produce heat, it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with higher and lower levels of carbon monoxide.

The effluent exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

Fuel processor 100 contains a series of process units for carrying out the general process as described in FIG. 1. It is intended that the process units may be used in numerous configurations as is readily apparent to one skilled in the art.

Furthermore, the fuel processor described herein is adaptable for use in conjunction with a fuel cell such that the hydrogen rich product gas of the fuel processor described herein is supplied directly to a fuel cell as a feed stream.

Figure 2:
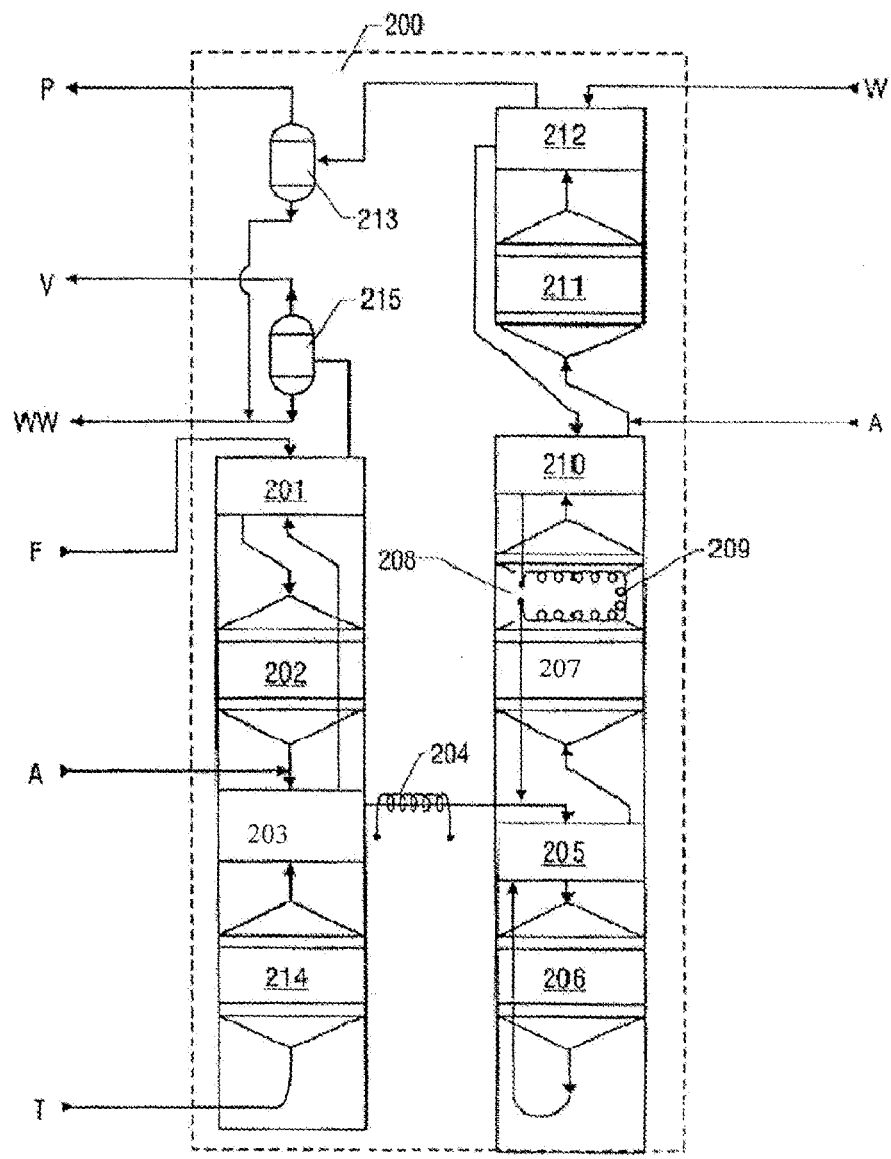
FIG. 2 illustrates an embodiment of a compact fuel processor.

With reference to FIG. 2, FIG. 2 illustrates an embodiment of a compact fuel processor. Fuel processor 200 as shown in FIG. 2 is similar to the process diagrammatically illustrated in FIG. 1 and described supra. Hydrocarbon fuel feed stream F is introduced to the fuel processor and hydrogen rich product gas P is drawn off. Fuel processor 200 includes several process units that each perform a separate operational function and is generally configured as shown in FIG. 2. In this illustrative embodiment, the hydrocarbon fuel F enters the first compartment into spiral exchanger 201, which preheats the feed F against fuel cell tail gas T (enters fuel processor 200 at ATO 214). Because of the multiple exothermic reactions that take place within the fuel processor, one of skill in the art should appreciate that several other heat integration opportunities are also plausible in this service. This preheated feed then enters desulfurization reactor 202 through a concentric diffuser for near-perfect flow distribution and low pressure drop at the reactor inlet. Reactor 202 contains a desulfurizing catalyst and operates as described in process step C of FIG. 1. (Note that this step does not accord with the order of process steps as presented in FIG. 1. This is a prime example of the liberty that one of skill in the art may exercise in optimizing the process configuration in order to process various hydrocarbon fuel feeds and/or produce a more pure product.) Desulfurized fuel from reactor 202 is then collected through a concentric diffuser and mixed with air A, with the mixture being routed to exchanger 203. In this illustrative embodiment, exchanger 203 is a spiral exchanger that heats this mixed fuel/air stream against fuel cell tail gas T (enters fuel processor 200 at ATO 214).

The preheated fuel/air mixture then enters the second compartment with the preheat temperature maintained or increased by electric coil heater 204 located between the two compartments. The preheated fuel-air mixture enters spiral exchanger 205, which preheats the stream to autothermal reforming reaction temperature against the autothermal reformer (ATR) 206 effluent stream. Preheated water (enters fuel processor 200 at exchanger 212) is mixed with the preheated fuel-air stream prior to entering exchanger 205. The preheated fuel-air-water mixture leaves exchanger 205 through a concentric diffuser and is then fed to the ATR 206, which corresponds to process step A of FIG. 1. The diffuser allows even flow distribution at the ATR 206 inlet. The hot hydrogen product from the ATR 206 is collected through a concentric diffuser and routed back to exchanger 205 for heat recovery. In this embodiment, exchanger 205 is mounted directly above the ATR 206 in order to minimize flow path, thereby reducing energy losses and improving overall energy efficiency. Flow conditioning vanes can be inserted at elbows in order to achieve low pressure drop and uniform flow through the ATR 206.

The cooled hydrogen product from exchanger 205 is then routed through a concentric diffuser to desulfurization reactor 207, which corresponds to process step C of FIG. 1. The desulfurized product is then fed to catalytic shift reactor 208, which corresponds with process step E in FIG. 1. Cooling coil 209 is provided to control the exothermic shift reaction temperature, which improves carbon monoxide conversion leading to higher efficiency. In this embodiment, cooling coil 209 also preheats ATR 206 feed, further improving heat recovery and fuel cell efficiency. The shift reaction product is then collected through a concentric diffuser and is cooled in spiral exchanger 210, which also preheats water feed W.

Air A is then introduced to the cooled shift reaction product, which is then routed to a concentric diffuser feeding preferred CO oxidation reactor 211. Reactor 211 oxidizes trace carbon monoxide to carbon dioxide, which corresponds to process step G in FIG. 1. Flow conditioning vanes may be inserted at elbows to achieve short flow paths and uniform low pressure drop throughout reactor 211. The effluent purified hydrogen stream is then collected in a concentric diffuser and is sent to exchanger 212 which recovers heat energy into the water feed W. The cooled hydrogen stream is then flashed in separator 213 to remove excess water W. The hydrogen gas stream P from separator 213 is then suitable for hydrogen users, such as a fuel cell.

In the embodiment described in FIG. 2, the combined anode and cathode vent gas streams from a fuel cell are introduced to fuel processor 200 for heat recovery from the unconverted hydrogen in the fuel cell. Integration of the fuel cell with the fuel processor considerably improves the overall efficiency of electricity generation from the fuel cell. The fuel cell tail gas T flows through a concentric diffuser to ATO 214. Hydrogen, and possibly a slip stream of methane and other light hydrocarbons are catalytically oxidized according to:

$$CH_4 + 2O_2 \rightarrow CO_2 + 2H_2O \tag{VII}$$

$$H_2 + \tfrac{1}{2}O_2 \rightarrow H_2O \tag{VII}$$

Equations VII and VIII take place in ATO 214, which can be a fixed bed reactor composed of catalyst pellets on beads, or preferably a monolithic structured catalyst. The hot reactor effluent is collected through a concentric diffuser and is routed to exchanger 203 for heat recovery with the combined fuel/air mixture from reactor 202. Heat from the fuel cell tail gas stream T is then further recovered in exchanger 201 before being flashed in separator 215. The separated water is connected to the processor effluent water stream W and the vent gas is then vented to the atmosphere.

Figure 3:
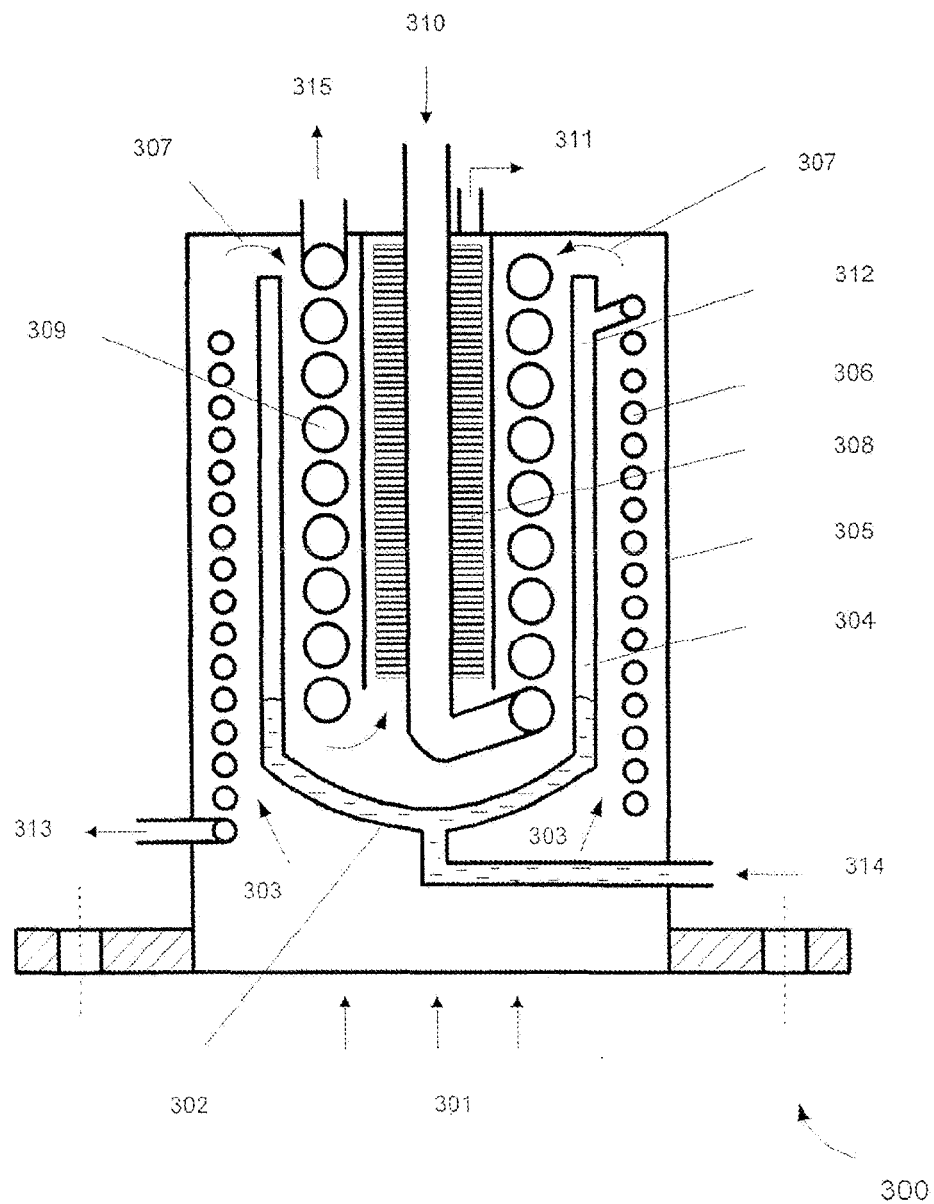
FIG. 3 illustrates an embodiment of a heat transfer unit.

With reference to FIG. 3, FIG. 3 illustrates an embodiment of the heat transfer unit 300 of the present invention. The heat transfer unit 300 of the present invention integrates a boiler and a gas preheater into one unit.

The hot exhaust gas will make three passes through the heat transfer unit 300. First, hot exhaust gas enters the heat transfer unit 300 from the unit inlet 301. Water enters the heat transfer unit 300 at the water inlet 314. The hot exhaust gas then hits the boiler reservoir 302 thus providing some heat to the water. The hot exhaust gas is then deflected to the first annular space 303 located between the outer surface of the bell shape evaporator 304 and the shell 305 and flows upward. Inside the first annular space 303, the hot exhaust gas exchanges heat to the small coils 306. Inside the small coils 306, steam from the bell shape evaporator 304 is superheated.

Second, at the top of the heat transfer unit 300 of the present invention, the hot exhaust gas turns around and flows downward into the second annular space 307 located between the inner surface of the bell shape evaporator 304 and the outside wall of the rolled fin heat exchanger 308. This is the second pass of the hot exhaust gas. During this pass, the hot exhaust gas provides further heat to the big coils 309. Inside the big coils 309, already preheated gas (air or fuel) gets further heat from the hot exhaust gas.

Third, the hot exhaust gas turns around again at the bottom of the heat transfer unit 300 of the present invention and moves upward through the rolled fin heat exchanger 308. Inside the rolled fin heat exchanger 308 the hot exhaust gas gives off heat to the gas (air or fuel) flowing downward through the central tubing 310. The rolled fin heat exchanger 308 is implemented in the design to enhance gas-gas heat transfer at locations where hot source gas has already been cooled down. This is the third and final pass of the hot exhaust gas. The now cooled hot exhaust gas exits the heat transfer unit 300 at the exhaust outlet 311.

With respect to steam production from the boiler component of the heat transfer unit 300, during the first pass when the hot exhaust gas hits the boiler reservoir 302, the water will evaporate and bubbles will be generated. The generated bubbles will float upward and come out of the liquid surface and merge together to form vapor at the bell shape empty space zone 312. The bell shape empty space zone 312 is designed to be large enough to allow the entrained water to be knocked down to stop the two-phase flow. After separation, only the steam vapor will enter into the small coils 306 and flow downward. Inside the small coils 306, as mentioned above, the steam is superheated to the desired temperature by the hot exhaust gas flowing upward. The generated superheated steam exits the heat transfer unit 300 at the steam outlet 313.

The boiler component of the heat transfer unit of the present invention is a compromise of both flow boiling and pool boiling. For example, as described above, the water inside the bell shape evaporator 304 can flow upward like a flow boiling—but it does not form slug easily as there is a big open space at the top for knocking liquid droplets down, which separates steam from liquid. On the other hand, the boiler also looks like a pool boiling as there is always some water remaining in the boiler reservoir 302 due to continued feeding of water from the water inlet 314 and as the minimum water level is usually kept there under steady state conditions. In addition, the boiler has better turn-down ratio for steam production because the boiling heat transfer area can change with the water level which correspondingly changes with the water flow rate.

With respect to gas preheating, cold gas (air or fuel) is fed into the heat transfer unit 300 from the central tubing 310 and flows downward. During this process, the cold gas gets heat from the hot exhaust gas via the rolled fin heat exchanger 308. Then the cold gas flows upward inside the big coils 309 and is further heated by the hot exhaust gas flowing downward. The now heated cold gas exits the heat transfer unit 300 at the gas outlet 315.

The design of the heat transfer unit 300 increases the heat transfer efficiency by increasing the contacting time between the hot exhaust gas and cold streams. The design also minimizes the unfavorable slug formation often encountered in a flow boiling type heat exchanger due to smaller coil diameter—thus with this design, more stable steam production can be achieved. In addition, the boiler has better turn-down ratio for steam production as the boiling heat transfer surface area can change with the water flow rate. Finally, with the design of the heat transfer unit 300, steam or gas can be heated to a higher temperature due to the counter-current flow path design between hot flue gas and cold streams.

In a preferred embodiment, the source of the hot stream is from an ATO exhaust gas. In a preferred embodiment, the shell 305 is six inches in diameter, the small coils 306 are ¼ inch in diameter, and the big coils 309 are ½ inch in diameter.

The following are some examples of predicted operating results based on heat transfer calculations for a preferred embodiment of the present invention having the above geometry. For example, when the ATO exhaust inlet temperature is 750° C. it is predicted that the superheated steam temperature could be 650° C., that the superheated gas (air or fuel) temperature will be 580° C., and that the ATO exhaust exit temperature will be 260° C. Similarly, when the ATO exhaust inlet temperature is 550° C. it is predicted that the superheated steam temperature will be 400° C., that the superheated gas (air or fuel) temperature will be 370° C., and that the ATO exhaust exit temperature will be 180° C.

Figure 4:
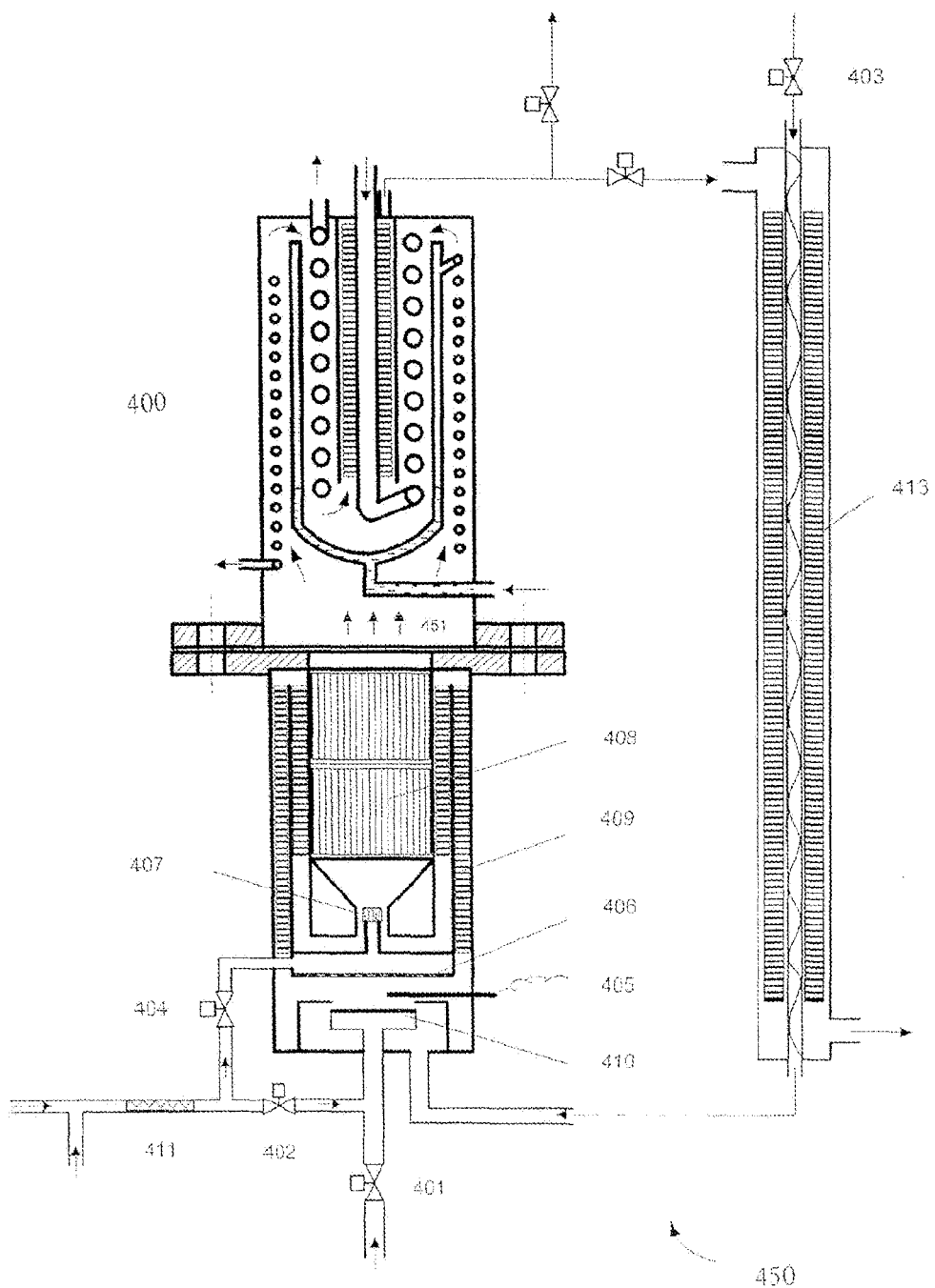
FIG. 4 illustrates an embodiment of a heat transfer unit utilized in conjunction with a hybrid combustor.

With reference to FIG. 4, FIG. 4 illustrates an embodiment of the heat transfer unit 400 of the present invention utilized in conjunction with a hybrid combustor 450. The hybrid combustor 450 includes a first valve 401 for allowing the entrance of primary air into the hybrid combustor 450; a second valve 402 for allowing the entrance of fuel (typically natural gas; propane, in addition to other fuels, may also be used) into the hybrid combustor 450; a third valve 403 for allowing the entrance of secondary air into the hybrid combustor 450; and a fourth valve 404 for allowing the entrance of fuel (typically natural gas and/or reformate) into the hybrid combustor 450. The mixing point of the fuel, the primary air, and the secondary air is located right before combustion zone of the hybrid combustor 450.

As shown in FIG. 4, the hybrid combustor 450 also includes a flame burner 410 with a spark ignitor 405 used for startup of the hybrid combustor 450; a high temperature deflectory plate 406; a reformate distributor 407; a catalytic burner 408; a heat exchanger 409; a secondary air preheater 413; and an inline mixer 411. In a preferred embodiment, the reformate distributor 407 may be a sparger type reformate distributor, the catalyst bed of the catalytic burner 408 may be a monolith catalyst bed, and the heat exchanger 409 may be a rolled fin type heat exchanger.

As illustrated in FIG. 4, the heat transfer unit 400 of the present invention may be located downstream of the hybrid combustor 450. The heat transfer unit 400 includes the same components and operates in the same manner as the heat transfer unit 300 described above with respect to FIG. 3. The hot combustor exhaust gas from the catalytic burner 408 enters the heat transfer unit 400 at the unit inlet 451 and passes through the heat transfer unit 400 three times (either up or down). These three passes, instead of just one pass, greatly increases the residence time of the hot flue gas contacting with the cold streams, thus enhancing heat transfer.

The combustion exhaust after passing the heat transfer unit 400 may be piped to the secondary air preheater 410. This exhaust may also be piped to an autothermal reforming (ATR) reactor for direct preheating of the reformer bed and the shift bed during the start-up of the ATR reactor. In addition, the natural gas may be preheated by direct mixing with the hot air from the integrated rolled fin heat exchanger.

In one illustrative embodiment, the hybrid combustor is a hybrid anode tailgas oxidizer (ATO).

While this invention has been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A heat transfer unit comprising:
    a shell;
    a boiler;
    a gas preheater wherein said gas preheater comprises a plurality of big coils;
        a central tubing; and a rolled fin heat exchanger;
    a first annular space;
    a second annular space;
    a plurality of inlets; and a plurality of outlets wherein said heat transfer unit is located downstream of a combustor, wherein said combustor is an anode tailgas oxidizer.

2. The heat transfer unit of claim 1, wherein said boiler comprises a boiler reservoir; a bell shape evaporator; a bell shape empty space zone; and a plurality of small coils.

3. The heat transfer unit of claim 1, wherein said plurality of inlets comprises a unit inlet; and a water inlet.

4. The heat transfer unit of claim 1, wherein said plurality of outlets comprises an exhaust outlet; a steam outlet; and a gas outlet.

5. The heat transfer unit of claim 4, wherein exhaust from exhaust outlet is piped to reforming reactor for direct preheating of reformer bed and shift bed during start-up of said reforming reactor.

6. The heat transfer unit of claim 4, wherein exhaust from exhaust outlet is piped to a secondary air preheater associated with said combustor.

7. A method for operating a heat transfer unit comprising:
providing a boiler and a gas preheater integrated into said heat transfer unit;
permitting hot exhaust gas to enter said heat transfer unit via a unit inlet;
routing hot exhaust gas to make a first pass through said heat transfer unit;
routing hot exhaust gas to make a second pass through said heat transfer unit;
routing hot exhaust gas to make a third pass through said heat transfer unit wherein said third pass comprises routing hot exhaust to flow upward through a rolled fin heat exchanger; and
permitting hot exhaust gas to exit said heat transfer unit via an exhaust outlet.

8. The method for operating the heat transfer unit of claim 7, wherein said first pass comprises: routing hot exhaust gas to contact a boiler reservoir; deflecting hot exhaust gas into a first annular space; and routing hot exhaust gas to flow upward and to contact a plurality of small coils.

9. The method for operating the heat transfer unit of claim 7, wherein said second pass comprises: routing hot exhaust gas to flow downward into a second annular space; and routing hot exhaust gas to contact a plurality of big coils.

10. The method for operating the heat transfer unit of claim 7, further comprising providing hot exhaust gas from a combustor.

11. The method for operating the heat transfer unit of claim 10, further comprising routing hot exhaust gas from said exhaust outlet to a secondary air preheater associated with said combustor.

12. The method for operating the heat transfer unit of claim 10, further comprising routing hot exhaust gas from said exhaust outlet to a reforming reactor to directly preheat reformer bed and shift bed during start-up of said reforming reactor.

13. The method for operating the heat transfer unit of claim 10, wherein said combustor is an anode tailgas oxidizer.

* * * * *